(12) United States Patent
Tardy-Tuch

(10) Patent No.: US 8,165,752 B2
(45) Date of Patent: Apr. 24, 2012

(54) STEERING SYSTEM OF A MOTOR VEHICLE

(75) Inventor: Georg Tardy-Tuch, Kapfenhardt (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 361 days.

(21) Appl. No.: 12/428,510

(22) Filed: Apr. 23, 2009

(65) Prior Publication Data

US 2009/0276123 A1 Nov. 5, 2009

(30) Foreign Application Priority Data

Apr. 30, 2008 (DE) .................. 10 2008 022 552

(51) Int. Cl.
*B62D 5/04* (2006.01)

(52) U.S. Cl. ........................ 701/41; 180/446; 180/444

(58) Field of Classification Search .............. 701/41, 701/42; 180/443, 444, 446; *B62D 5/04*
See application file for complete search history.

(56) References Cited

U.S. PATENT DOCUMENTS

| | | | | |
|---|---|---|---|---|
| 4,261,265 A * | 4/1981 | Bertelsbeck | .................. | 104/247 |
| 4,624,145 A * | 11/1986 | Weber et al. | ................ | 73/862.31 |
| 5,413,461 A * | 5/1995 | Johnsen | ............................ | 416/1 |
| 7,311,173 B2 | 12/2007 | Takimoto et al. | | |
| 7,537,081 B2 * | 5/2009 | Matsuda | ........................ | 180/444 |
| 2003/0109968 A1 * | 6/2003 | Hessmert et al. | ................. | 701/1 |
| 2007/0289806 A1 * | 12/2007 | Matsuda | ....................... | 180/444 |
| 2011/0264345 A1 * | 10/2011 | Heim et al. | ..................... | 701/70 |

FOREIGN PATENT DOCUMENTS

| | | | |
|---|---|---|---|
| DE | 198 54 687 A1 | 5/2000 | |
| DE | 10 2005 032 037 B4 | 10/2007 | |
| FR | 2921621 A1 * | 4/2009 | |
| JP | 2007118805 A | 5/2007 | |
| JP | 2008056224 A | 3/2008 | |
| JP | 2008062837 A | 3/2008 | |

OTHER PUBLICATIONS

German Patent and Trademark Office Search Report, dated Jan. 21, 2009.

* cited by examiner

*Primary Examiner* — Mark Hellner
*Assistant Examiner* — Ari M Diacou

(57) ABSTRACT

A steering system of a motor vehicle has a steering wheel which engages a steering rack via a steering pinion of a steering column. A steering torque is exerted by a driver on the steering rack via the steering wheel. A steering torque assistance unit is provided and has an electric drive and a gear stage. A steering assistance torque is able to be exerted on the steering rack via the electric drive of the steering torque assistance unit. The electric drive engages the steering rack via the gear stage. Accordingly, at least one sensor determines by measurement a bearing force acting on a bearing of the steering torque assistance unit, the steering torque assistance unit generating the steering assistance torque in dependence on the steering torque exerted by the driver and in dependence on the bearing force determined by measurement.

8 Claims, 2 Drawing Sheets

STEERING SYSTEM OF A MOTOR VEHICLE

CROSS-REFERENCE TO RELATED APPLICATION

This application claims the priority, under 35 U.S.C. §119, of German application DE 10 2008 022 552.5, filed Apr. 30, 2008; the prior application is herewith incorporated by reference in its entirety.

BACKGROUND OF THE INVENTION

Field of the Invention

The invention relates to a steering system of a motor vehicle. Known from German patent DE 10 2005 032 037 B4, corresponding to U.S. Pat. No. 7,311,173, is a steering system for a motor vehicle in which a steering torque can be applied to a steering rack by a steering wheel which engages the steering rack via a steering pinion of a steering column. In addition, the steering system according to the prior art has available an electric steering torque assistance unit which includes an electric drive, an electrical assistance force being able to be applied to the steering rack with the aid of the steering torque assistance unit.

With steering systems having an electric steering torque assistance unit of this type it is difficult to provide an informative steering feel to the driver at the steering wheel since an electric steering torque assistance unit has high inertia, in particular rotational inertia. The transmission of road surface signals to the steering wheel is thereby sharply reduced, ultimately producing a steering feel for the driver which is low-pass filtered and has little authenticity. There is therefore a need for a steering system with an electric steering torque assistance unit in which an authentic steering feel is provided for the driver and, accordingly, the steering feel can be improved for the driver.

SUMMARY OF THE INVENTION

It is accordingly an object of the invention to provide a steering system of a motor vehicle that overcomes the above-mentioned disadvantages of the prior art devices of this general type, which creates a novel steering system of a motor vehicle with which the steering feel can be improved.

With the foregoing and other objects in view there is provided, in accordance with the invention, a steering system of a motor vehicle. The steering system contains a steering rack, a steering column having a steering pinion, and a steering wheel engaging the steering rack via the steering pinion of the steering column. A steering torque is able to be exerted by a driver on the steering rack via the steering wheel. A steering torque assistance unit is provided and has an electric drive, a gear stage, and a bearing. A steering assistance torque is able to be exerted on the steering rack by the electric drive of the steering torque assistance unit, the electric drive engaging the steering rack via the gear stage. At least one sensor is provided for determining by measurement a bearing force acting on the bearing of the steering torque assistance unit. The steering torque assistance unit generates the steering assistance torque in dependence on the steering torque exerted by the driver and in dependence on the bearing force determined by the measurement.

According to the invention at least one sensor determines by measurement a bearing force acting on a bearing of the steering torque assistance unit. The steering torque assistance unit generates the steering assistance torque in dependence on the steering torque exerted by the driver and in dependence on the bearing force determined by measurement.

Within the meaning of the present invention, in the inventive steering system a bearing force acting on a bearing of the electric steering torque assistance unit is determined by measurement.

According to the invention, the steering assistance torque applied to the steering rack by the steering torque assistance unit is dependent on the steering torque exerted by the driver and in addition on the bearing force determined by measurement. In this way, by bypassing the high inertia of the electric steering torque assistance unit, a good steering feel can be provided for the driver.

The gear stage of the steering torque assistance unit may advantageously be mounted on a steering housing via a bearing, the or each sensor determining by measurement the bearing force acting on the bearing. The robustness and reliability of the steering system, in particular with regard to the generation of the steering assistance torque, are thus further improved.

Other features which are considered as characteristic for the invention are set forth in the appended claims.

Although the invention is illustrated and described herein as embodied in a steering system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
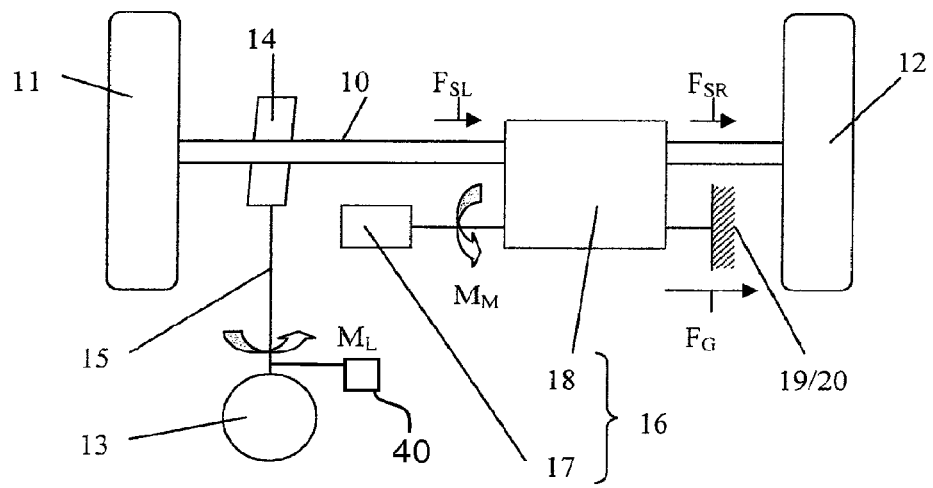
FIG. 1 is a highly schematized view of a steering system according to the invention.

Referring now to the figures of the drawing in detail and first, particularly, to FIG. 1 thereof, there is shown a schematized representation of a steering system of a motor vehicle, the steering system containing a steering rack 10 which is engaged by wheels 11, 12 via non-illustrated track rods. A further component of the steering system is a steering wheel 13 which is coupled to the steering rack 10 via a steering pinion 14 of a steering column 15, a steering torque $M_L$ being able to be applied by a driver to the steering rack 10 via the steering wheel 13. The steering column 15 may be, for example, a mechanical or hydraulic or electric steering column.

The steering system of FIG. 1 further includes an electric steering torque assistance unit 16 which includes an electric drive 17 and a gear stage 18, the electric drive 17 engaging the steering rack 10 via the gear stage 18. By the electric drive 17, an electric steering assistance torque $M_M$ can be applied to the steering rack 10 via the gear stage 18. According to FIG. 1 the electric steering torque assistance unit 16 is mounted on a steering housing 20 via a bearing 19, the bearing 19 being implemented between the steering housing 20 and the gear stage 18 of the steering torque assistance unit 16.

While driving, so-called track rod forces $F_{SL}$, $F_{SR}$ act on the steering rack 10 as road surface signals. Because an electric steering torque assistance unit 16 has high inertial mass, in steering systems known from the prior art the track rod forces $F_{SL}$, $F_{SR}$ of the steering torque assistance unit 16 are filtered and at least partially absorbed, so that, with steering systems known from the prior art, road surface signals can be transmitted only incompletely to the steering wheel 13. With these steering systems known from the prior art low-pass filtering generally takes place, important road surface signals not being transmitted to the driver via the steering wheel 13 and no authentic steering feel being communicated to the driver.

Within the meaning of the present invention it is proposed to determine by measurement a bearing force $F_G$ acting on the bearing 19 of the steering torque assistance unit 16 during driving operation by at least one sensor. In this case the bearing force $F_G$ determined by measurement is proportional to the actual track rod forces $F_{SL}$, $F_{SR}$ acting on the steering rack 10. As a function of the bearing force $F_G$ determined by measurement and as a function of the steering torque $M_L$ exerted by the driver, the drive 19 of the steering torque assistance unit 16 then supplies the electric steering assistance torque $M_M$ to the steering rack 10. In this way an authentic steering feel can be provided and road surface signals which indicate, for example, a road surface condition and/or changes in the road surface material can be communicated to the driver.

Figure 2:
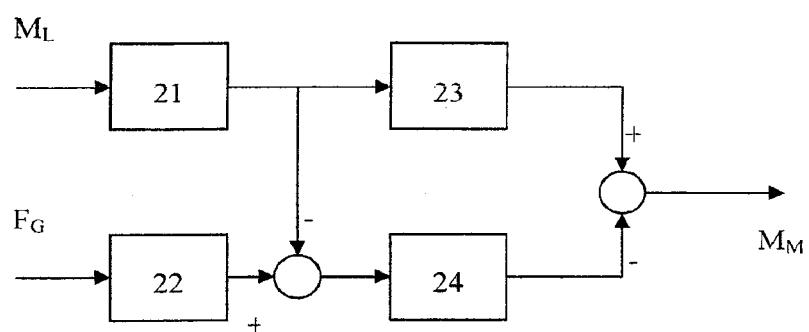
FIG. 2 is a block diagram for further clarification of the inventive steering system.

The provision of the electrical steering assistance torque $M_M$ by the electric drive 17 of the steering torque assistance unit 16 as a function of the steering torque $M_L$ exerted by the driver and of the bearing force $F_G$ determined by measurement is clarified in FIG. 2. Thus, as shown in FIG. 2, the steering torque $M_L$ exerted by the driver can be supplied to a block 21 as an input value, the steering torque $M_L$ exerted by the driver being amplified in block 21, in particular as a function of a steering angle and/or a steering velocity and/or a vehicle speed. The bearing force $F_G$ determined by measurement is supplied to a block 22 in which the bearing force determined by measurement is converted by calculation into a corresponding torque. An output value of block 21 is supplied as an input value to a block 23, an optional filtering taking place in block 23. In addition, the output value of block 21 is computed with the output value of block 22 and the value determined by this calculation is supplied to block 24, in which an optional filtering may also take place. The output values of blocks 23 and 24 are then computed with one another as shown in FIG. 2 in order to determine the electrical steering assistance torque $M_M$ to be made available by the drive 17.

Accordingly, in the inventive steering system which includes an electric steering torque assistance unit 16, the bearing force $F_G$ acting on the bearing 19, via which the electric steering torque assistance unit 19 is mounted to the steering housing 20, is determined by measurement, the electrical steering assistance torque $M_M$ being determined as a function of this bearing force $F_G$ determined by measurement and of the steering torque $M_L$ exerted by the driver and measured by sensor 40.

The determination by measurement of the bearing force $F_G$ acting on the bearing 19 is effected directly or indirectly, in such a manner that the determined bearing force $F_G$ is independent of rotational inertias of the steering torque assistance unit 16. It is thereby possible, despite a high inertial mass of the electric steering torque assistance unit 16, to make available at the steering wheel 13 of the steering system a good steering feel dependent on road surface signals. This is because the determined bearing force $F_G$ is proportional to the actually effective steering rack force or to the actually effective track rod force.

Figure 3:
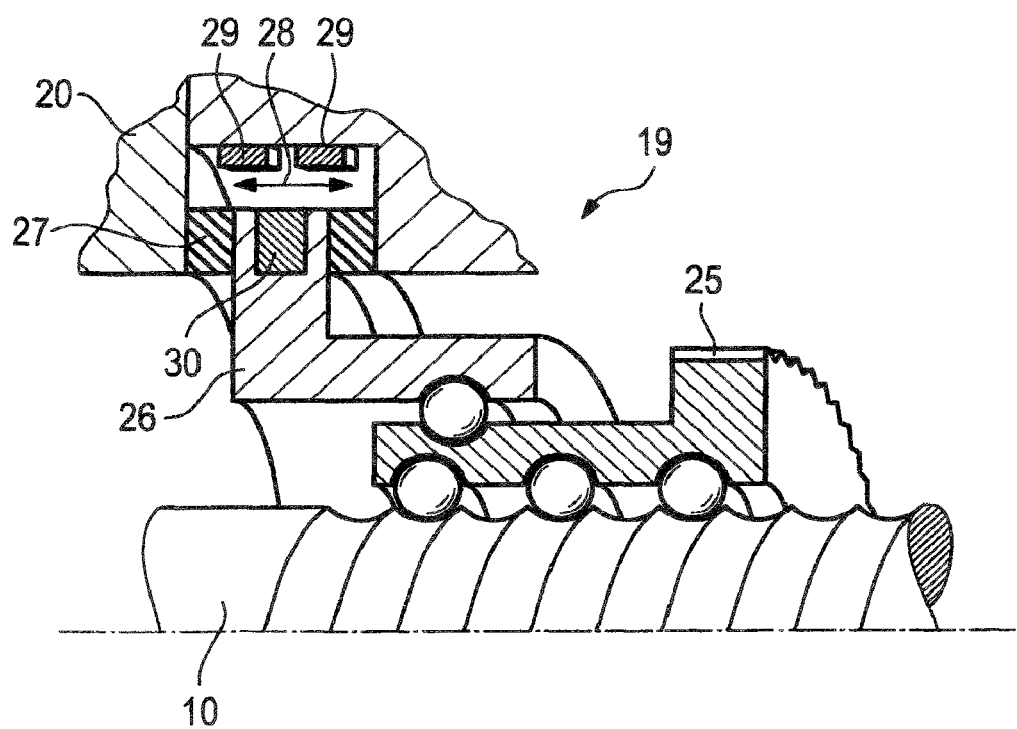
FIG. 3 is an illustration of a detail from the steering system of FIG. 1.

For the determination by measurement of the bearing force $F_G$ acting on the bearing 19, the procedure described below with reference to FIG. 3 may, for example, be followed. FIG. 3 shows a recirculating ball mechanism with the steering rack 10, the recirculating ball nut 25 and the ball bearing 26, the ball bearing 26 being configured as a thrust element. Thus, in the exemplary embodiment of FIG. 3, a recirculating ball nut 25 of the gear stage 18 of the electric steering torque assistance unit 16 is shown, via which nut 25 the steering torque assistance unit 16 engages the steering rack 10.

The gear stage 18, and therefore the steering torque assistance unit 16, is mounted on the bearing housing 20 via a ball bearing 26 which engages the recirculating ball nut 25, an intermediate element 27, which in the exemplary embodiment shown in FIG. 3 is in the form of an elastic mounting, being provided for support on the bearing housing 20. Thus, associated with the ball bearing 26 is an elastomer by which an elastic mounting, the intermediate element 27, is formed in the region of the steering housing 20, which intermediate element 27 permits a relative displacement between the ball bearing 26 and the steering housing 20 in the direction of the double arrow 28.

As shown in FIG. 3, two sensors 29, which may be in the form of Hall sensors and which cooperate with a magnet 30 associated with the ball bearing 26, are associated with the bearing housing 20.

As a function of the displacement of the ball bearing 26 and of the associated magnet 30 in the direction of the double arrow 28 relative to the sensors 29 associated with the bearing housing 20, the sensors 29 make available a signal which corresponds to the displacement of the ball bearing 26, and therefore of the gear stage 18, relative to the fixed steering housing 20, it being possible to determine the bearing force $F_G$ from this displacement and from the stiffness of the intermediate element 27 in the form of an elastomer.

The bearing force $F_G$, determined by measurement in the above manner, of the bearing 19 between bearing housing 20 and steering torque assistance unit 16 is derived indirectly and is independent of rotational inertias of the steering torque assistance unit 16. The use of at least two sensors provides a redundancy in the measurement of the bearing force which is desirable for safety reasons.

Contrary to the exemplary embodiment shown, it is also possible to determine the bearing force directly on a preferably non-elastic bearing, using at least one piezoelectric, preferably piezoceramic sensor.

The invention claimed is:

1. A steering system of a motor vehicle, the steering system comprising:
    a steering rack;
    a steering column having a steering pinion;
    a steering wheel engaging said steering rack via said steering pinion of said steering column, a steering torque being able to be exerted by a driver on said steering rack via said steering wheel;
    a steering torque assistance unit having an electric drive, a gear stage, and a bearing, a steering assistance torque being able to be exerted on said steering rack by means of said electric drive of said steering torque assistance unit, said electric drive engaging said steering rack via said gear stage; and
    at least one sensor determining by measurement a bearing force acting on said bearing of said steering torque assistance unit, and said steering torque assistance unit generating the steering assistance torque in dependence on the steering torque exerted by the driver and in dependence on the bearing force determined by the measurement.

2. The steering system according to claim 1, wherein the bearing force determined by measurement is proportional to an actual steering rack force.

3. The steering system according to claim 1, wherein said sensor determines the bearing force acting on said bearing of said steering torque assistance unit one of directly and indirectly such that the bearing force determined is independent of rotational inertias of said steering torque assistance unit.

4. The steering system according to claim 1, further comprising a steering housing, said gear stage of said steering torque assistance unit is mounted on said steering housing by means of said bearing, and said sensor determining by measurement the bearing force acting on said bearing.

5. The steering system according to claim 4, wherein said steering housing has an elastic element mounting said bearing resulting in an elastically mounted bearing, said gear stage of said steering torque assistance unit is mounted on said steering housing via said elastically mounted bearing, and the bearing force is determined indirectly from a displacement of said gear stage with respect to said elastically mounted bearing and from a stiffness of said elastic element.

6. The steering system according to claim 5, wherein said sensor includes at least two Hall sensors for detecting a displacement of said gear stage with respect to said elastically mounted bearing.

7. The steering system according to claim 4, wherein said gear stage of said steering torque assistance unit is mounted on said steering housing via said bearing being a non-elastically mounted bearing, and in that the bearing force is determined directly.

8. The steering system according to claim 7, wherein said sensor includes at least two piezoelectric sensors for detecting the bearing force.

* * * * *